United States Patent Office 3,244,678
Patented Apr. 5, 1966

3,244,678
PROCESS FOR COPOLYMERIZING A STRAIGHT CHAIN ALPHA OLEFIN WITH A CONJUGATED DIENE
Stanley Tocker, Wilmington, Del., assignor to E. I. du Pont de Nemours and Company, Wilmington, Del., a corporation of Delaware
No Drawing. Filed Mar. 9, 1962, Ser. No. 178,544
5 Claims. (Cl. 260—85.3)

This application is a continuation-in-part of applicant's copending application Serial No. 789,273, filed January 27, 1959, now abandoned.

This invention relates to olefin polymers, and more particularly to novel copolymers of at least one straight chain alpha olefin and at least one conjugated diene, and to a process for preparing such copolymers.

The olefin polymers, and especially the alpha olefinic hydrocarbon polymers, are assuming increasing importance in such fields as packaging films, laminates, coatings, moldings and the like. The range of properties of the polyolefins are, in general, well suited for these purposes. However, there are some respects in which the polyolefins have shortcomings. In particular, in the utilization of polyolefins in the field of packaging films, for example, difficulties are experienced in arriving at a suitable balance of properties so that there may be obtained a film stiff enough to run well on bag making and printing machines of the trade and at the same time a film that is readily heat-sealable and has adequate durability and resistance to impact for low temperature uses to which the packaged article may be subjected. Accordingly, improvements in these respects continue to be sought.

One approach to the solution of this problem is to modify the olefin by copolymerization with another polymerizable compound. Among these, the copolymerization of an alpha olefin with a conjugated diene to produce polymers adaptable for various applications is particularly well known. For example, U.S. Patent 2,-200,429 describes the copolymerization of ethylene with butadiene to produce a rubbery interpolymer of ethylene and butadiene. Similarly, U.S. Patent 2,342,400 discloses the polymerizability of ethylene with various monomers including butadiene and isoprene in the presence of a peroxide catalyst. A characteristic of these copolymers made with a conjugated diene as a monomer component is that the product contains residual carbon-to-carbon unsaturation. Further, this unsaturation resides primarily in the main polymer chain. This point of unsaturation can be a weak point in the structure in that it is susceptible to scission through the process of aging or, when attempts are made to further modify the polymer by reactions on the double bond, the carbon-to-carbon linkage is broken, the molecular weight of the polymer is thus lowered and desirable physical properties of the polymer are consequently degraded. Means have been sought for producing a modified olefin polymer which would be capable of subsequent modification but which would be free of the objectionable unsaturation in the main polymer chain and with the double bond far enough removed from the main chain to prevent isomerization into the chain. In U.S. Patent 2,577,822 it is related that a copolymer comprising a major proportion of isobutylene (gamma-butylene) and a minor proportion of a cyclodiene, such as cyclopentadiene, gives rise to such a copolymer that is free of residual unsaturation in the principal carbon chain. As pointed out in that specification, the general experience is that copolymerization of an olefin and a straight chain conjugated diolefin results in the formation of a copolymer containing residual unsaturation in the main carbon chain.

The broad object of this invention, therefore, is to provide a predominantly alpha olefin polymer which can be made into film suitable for the manifold requirements of the packaging field. Another object is to provide a predominantly olefinic polymer which is readily amenable to further modifying treatments to render the polymer more suitable for use as a packaging film. Still another object is to provide a predominantly polyethylene polymer which in film form will operate satisfactorily on converter machines, heat seal readily and have adequate tenacity and resistance to impact at low temperature, in addition to the various other requirements for a packaging film. These and other objects will more clearly appear from the description which follows.

The foregoing and related objects are realized by the present invention which, broadly stated, comprises reacting from 99 to 75 percent by weight of at least one straight chain alpha olefin and having 2 to 10 carbon atoms with from 1 to 25 percent by weight of at least one conjugated diene of the formula $CH_2=CH—CR'=CH_2$ wherein R' is a radical selected from the group consisting of methyl, ethyl, propyl, chlorine, fluorine, acetoxy, chloroacetoxy, butyroxy and cyano radicals in a liquid halogenated hydrocarbon solvent and at a temperature of $-30°$ C. to $10°$ C., in the presence of a catalytic amount of a catalyst formed from the reaction of a reducible polyvalent metal compound containing at least one metal of the group consisting of metals of Groups IVa, Va and VIa of the Periodic Table (Mendeléeff's Periodic Table of the Elements, 25th edition of "Handbook of Chemistry and Physics"), iron, cobalt, copper, nickel and manganese, said metal having directly attached thereto at least one substituent from the group consisting of halogen, oxygen, hydrocarbons, and —O— hydrocarbons, with not more than a three fold molar amount of a reducing compound to reduce the valence of the metal component, said reducing compound being selected from the group consisting of metal hydrides and compounds having a metal of Groups I, II and III of the Periodic Table, said metal being above hydrogen in electromotive series and attached directly through a single bond to a carbon atom, said carbon atom selected from the group consisting of trigonal carbon and tetrahedral carbon, said reducing compound having no halogen atom attached directly to the metal, whereby to produce a highly crystalline, substantially linear, polymeric composition comprising 99 to 75 percent by weight of a recurring group A and 1 to 25 percent by weight of at least one of the recurring groups B and C where A is $—CHR—CH_2—$, B is

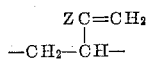
$—CH_2—CH—$ and C is

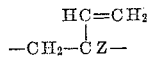
$—CH_2—CZ—$ wherein R is selected from the group consisting of hydrogen and straight chain alkyl groups of 1 to 8 carbon atoms, and Z is a radical selected from the group consisting of methyl, ethyl, propyl, chlorine, fluorine acetoxy, chloroacetoxy, butyroxy and cyano radicals wherein each of the recurring groups B and C is attached to itself, to each other or to recurring group A, said polymeric composition being characterized by the structural arrangement wherein the residual carbon-to-carbon unsaturation is located predominantly in pendant ethylenic groups attached to the main polymer chain, with no more than one mol percent of residual unsaturation from the diene units located in the main polymer chain, said polymer having an inherent viscosity above 0.3 as measured at 0.1% solids at 150° C. in alpha-chloronaphthalene.

In the preferred embodiment of the invention the reaction is carried out in a halogenated hydrocarbon solvent, and preferably one with a dipole moment above 1.3, such as chlorobenzene, under nitrogen atmosphere. The preferred catalyst combination is the product of the reaction between vanadyl trichloride and aluminum triisobutyl, and with this catalyst system the preferred mol ratio of the latter to the former is not greater than 3. The preferred monomers, ethylene and isoprene in the prescribed mol ratio, are introduced under nitrogen into the reaction vessel which is held at a temperature preferably in the range of $-10°$ C. to $10°$ C. and at the autogenous pressure of the reactants, which the preferred reaction conditions will fall in the range of 1–60 atmospheres. After the reaction has been continued for a suitable length of time effective to yield a copolymer having an inherent viscosity of at least 0.3 (i.e., a film-forming copolymer), the reaction is terminated by the introduction of alcohol or a solution of a water-miscible alcohol and water. The product is further purified by washing with a mixture of 3% concentrated hydrochloric acid in methanol and 20% water in methanol and finally with methanol after which the product is dried. The preferred composition of polymer lies in the range of 90–99% by weight ethylene and 1–10% by weight isoprene.

The resulting polymeric composition, with a crystallinity of at least 50%, comprises 99–90% by weight of the recurring group $-CH_2-CH_2-$, and 1–10% by weight of least one of the recurring groups

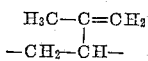

and

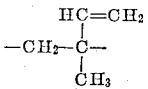

attached as above described. The polymeric composition is further characterized by the structural arrangement wherein the residual carbon-to-carbon unsaturation is located predominantly in pendant isopropenyl and a lesser number of vinyl groups as indicated by infrared absorption bands at 888 cm.$^{-1}$ for the isopropenyl group and 933 cm.$^{-1}$ and 910 cm.$^{-1}$ for the vinyl group, with no more than one mol percent of residual unsaturation located in the main polymer chain, said polymer having an inherent viscosity of at least 0.3 as measured at 0.1% solids at 150° C. in alpha-chloronaphthalene.

In addition to ethylene, other alpha-olefins having up to 10 carbon atoms may be employed such as propylene, butene-1, pentene-1, hexene-1, heptene-1, octene-1 and decene-1 are operable in this invention.

Of the class of conjugated dienes of the formula $CH_2=CH-CH'=CH_2$ where R' is a radical selected from the group consisting of methyl, ethyl, propyl, chlorine, fluorine, acetoxy, chloroacetoxy, butyroxy and cyano radicals, isoprene is the preferred member. Other members of the class of conjugated dienes useful for purposes of this invention are: 2-ethyl-1,3-butadiene, 2-propyl-1,3-butadiene, 2-chloro-1,3-butadiene, 2-fluoro-1,3-butadiene, 2-acetoxy-1,3-butadiene, 2-chloroacetoxy-1,3-butadiene, 2-butyroxy-1,3-butadiene and 2-cyano-1,3-butadiene.

As indicated above, the catalytic systems useful for promoting the polymerization between the alpha olefins and conjugated dienes as hereinabove described are those resulting from the reaction of a reducible polyvalent metal compound containing at least one metal of the group consisting of metals of Groups IVa, Va and VIa of the Periodic Table, iron, cobalt copper, nickel and manganese, said metal having directly attached thereto at least one substituent from the group consisting of halogen, oxygen, hydrocarbon and $-O-$ hydrocarbons, with not more than a three fold molar amount of a reducing agent, in the preferred embodiment, to reduce the valence of the metal component of the reducible compound, said reducing compound being selected from the group consisting of metal hydrides and compounds having a metal of Groups I, II and III of the Periodic Table, said metal being above hydrogen in electromotive series and directly attached through a single bond to a carbon atom, said carbon atom being selected from the group consisting of trigonal carbon, a carbon atom having two single and a double bond, e.g.,

and tetrahedral carbon. Examples of such catalyst systems are:

Vanadyl trichloride (VOCl$_3$) plus aluminum triisobutyl
Vanadium tetrachloride (VCl$_4$) plus aluminum triisobutyl
Titanium tetrachloride (TiCl$_4$) plus aluminum triisobutyl
Titanium tetrachloride (TiCl$_4$) plus sodium naphthalene
Ferric bromide (FeBr$_3$) plus aluminum triisobutyl
Chromium chloride (CrCl$_3$) plus aluminum triisobutyl
Manganese bromide (MnBr$_2$) plus aluminum triisobutyl
Manganese bromide (MnBr$_2$) plus zinc diisobutyl
Titanium tetrachloride plus lithium aluminum tetradecyl
Vanadyl trichloride plus lithium butyl
2-ethyl hexyl vanadate plus aluminum triisobutyl
Molybdenum chloride (MoCl$_5$) plus aluminum triisobutyl
Tetraisopropyl titanate [Ti(OC$_3$H$_7$)$_4$] plus aluminum triisobutyl
Tetraisobutyl titanate [Ti(OC$_4$H$_9$)$_4$] plus sodium naphthalene
Tetraethyl zirconate [Zr(C$_2$H$_5$)$_4$] plus aluminum triisobutyl
Vanadium dichloride (VCl$_2$) plus aluminum triisobutyl
Vanadyl dichloride plus aluminum diisobutyl butoxide
Vanadium tetrachloride plus aluminum isobutyl dibutoxide
Silver oxide (Ag$_2$O) plus aluminum triisobutyl Typical examples of Group IVa metals are titanium, zirconium and hafnium; Group Va metals are vanadium, columbium and tantalum; and Group VIa metals are chromium, molybdenum and tungsten.

The components of the catalyst system are normally employed in catalytic quantities. The mol ratio of reducing compound to the component containing a metal element attached to a halogen, oxygen, hydrocarbon and/or $-O-$ hydrocarbon may be in the range of 1:1 to 5:1; the optimum ratios will be found between 2.5:1 and 3.5:1. The concentration of the component containing a metal element attached to halogen, oxygen, hydrocarbon and/or $-O-$ hydrocarbon groups may be as low as .001 percent to as much as 1.0 percent based on the weight of the polymer.

Typical of the class of liquid halogenated hydrocarbons are the following: chlorobenzene, bromobenzene, fluorobenzene, o-dichlorobenzene, m-dichlorobenzene, o-chlorotoluene, m-chlorotoluene and tetrachloroethylene.

The reaction conditions under which the copolymerization is performed are very critical. Best results are obtained when the reaction is carried out in the range of 0 to 10° C. The reaction may be carried out at temperatures as low as $-40°$ C. and products with predominantly lateral isopropenyl and a lesser amount of vinyl unsaturation with essentially no "in-chain" unsaturation are produced, but the reaction rate becomes progressively slower as the temperature is lowered. The infrared analysis was carried out on 3–7 mil films with a Perkin-Elmer infrared spectrophotometer, Model 21 and Perkin-Elmer Infracord spectrophotometer. If a nonpolar solvent is used, essentially no copolymer of the type described above is obtained at the low polymerization temperatures. At temperatures above 10° C., such difficulties as decreased conjugated diene uptake and increased occurrence of in-chain unsaturation are encountered. Since products free of unsaturation in the chain are desired, it is preferable to conduct the reaction at temperatures below 10° C., as previously indicated.

The reaction is most conveniently conducted at the autogenous pressure of the reactants, which in the preferred temperature range would be about 60 atmospheres. However, if desired, pressures up to 500 atmospheres or even 1000 atmospheres may be employed.

The copolymers of this invention may be in the form of block copolymers, graft copolymers or random copolymers.

The following examples of preferred embodiments will serve to further illustrate the principles and practice of this invention.

EXAMPLE 1

To 1.0 liter of stirred chlorobenzene, purified by distillation over calcium hydride, there was added under nitrogen 4 ml. (4 mmols) of vanadyl chloride ($VOCl_3$) and 12 ml. (12 mmols) of 1.0 M aluminum triisobutyl. The nitrogen flow was stopped and simultaneously ethylene at 175 cc. (.008 mol)/min. and isoprene solution (30 ml. diluted to 100 ml. with chlorobenzene) at 0.5 ml. (.001 mol)/min. were passed into the reactor held at 5° C.–10° C. The reaction was carried out for 3 hours after which the product was washed successively in an Osterizer with (a) 3% concentrated hydrochloric acid in methanol, (b) 20% water in methanol, and (c) methanol, and then dried at 50° C. in a vacuum oven.

Infrared analysis showed the material to be a 10:1 weight ratio ethylene/isoprene copolymer. The ratio of isopropenyl to vinyl groups was determined to be 16:1, as indicated by absorption at 888 cm.$^{-1}$ characteristic of isopropenyl and at 993 cm.$^{-1}$ and 910 cm.$^{-1}$ characteristic of vinyl, and there was no detectable (less than 1.0 mol percent) in-chain unsaturation. An X-ray diffraction pattern showed the copolymer to have about a level of crystallinity of at least 50%; the copolymer had two sharp melting points, 130° C. and 135° C., indicating further its highly crystalline nature, and an inherent viscosity at 0.1% solids in alpha-chloronaphthalene at 150° C. of 4.8. Extraction of this copolymer with chlorobenzene or toluene showed no composition change, indicating that homopolymers were absent.

"Inherent viscosity" is defined by L. H. Cragg, J. of Colloid Science I, 261–269 (1946).

$$\text{Inherent viscosity} = \frac{\ln N_r}{c}$$

wherein "ln" is the natural logarithm, "$N_r$" is the viscosity of the solution relative to the solvent and "$c$" is the concentration expressed in grams of solute/100 ml. of solvent.

EXAMPLE 2

This example was carried out in the manner described in Example 1 except that all of the isoprene was introduced into the reactor before addition of ethylene was begun. Infrared examination of the product indicated it to be similar to that obtained in Example 1, but about 1% of the carbon-to-carbon double bond unsaturation was determined to be in-chain unsaturation. The inherent viscosity of the copolymer at 0.1% solids in alpha-chloronaphthalene at 150° C. was 8.3.

EXAMPLE 3

Physical properties of films made from the ethylene/isoprene copolymers and from a control polyethylene film made from polyethylene not modified with isoprene are shown in the table below.

PHYSICAL PROPERTIES*

|  | Ethylene/ Isoprene Copolymer (Example 1) | Linear Polyethylene Control |
|---|---|---|
| Modulus (p.s.i.) | 74,000 | 120,000 |
| Elongation (percent) | 150 | 100–150 |
| Tenacity (p.s.i.) | 4,600 | 3,000 |
| Tear (g./mil) | 171 | 50–100 |
| Pneumatic Impact (kg. cm./mil) | 3.6 | 2.0 |

* Samples pressed at 150° C. for 0.5 min. at 30 tons pressure—initial area of sample—1 sq. in.

The values tabulated above were determined as follows:

*Tear strength*

Tear strength is measured on an Elmendorf tester. A film is cut to form sample strips of 2.5" x 5.0" each. Ten such strips from each direction, i.e., 10 having the longer dimension running in the machine direction or the direction in which the film was extruded or calendered, and 10 having the longer dimension running in a direction transverse to the machine direction, are conditioned and tested at 75° C. and 35% relative humidity. The tester consists of a stationary jaw and a movable jaw mounted on a pendulum swinging on a substantially frictionless bearing and equipped with a means for measuring the maximum arc through which the pendulum will swing. The force required to extend the initial tear is measured by determining the work done in tearing the film through a given distance. The work is determined from the difference in the swing of a pendulum, first free and then impeded by tearing the film. Auxiliary weights may be added to the pendulum when the tear strength of a single sheet of film exceeds the capacity of the pendulum alone. The scale of the Elmendorf tester, a standard instrument of the paper industry, reads in terms of grams/1.69" of tear/16 sheets. Since 10 sheets are used in the present test, the values obtained from the tester must be corrected and are then converted to grams/1.69" of tear/mil of thickness.

*Pneumatic impact strength*

Pneumatic impact strength is the energy required to rupture a film. It is reported in kilogram-centimeters/mil of thickness of the film sample. Pneumatic impact strength is determined by measuring the velocity of a ball mechanically accelerated by air pressure, first in free flight and then in flight immediately after being impeded by rupturing the test film sample. In this test, the film sample is 1¾" x 1¾". The projectiles are steel balls ½" in diameter and weighing 8.3 grams. The free flight ball velocity is 40±2 meters/second. The velocities are measured by timing photoelectrically the passage of the steel balls between 2 light beams set a definite distance apart. The pneumatic impact strength is measured by the loss in kinetic energy of the ball due to the rupturing of the film sample. It is calculated from the following formula:

Constant X (Square of velocity in free flight minus square of velocity in impeded flight)

where the constant is directly proportional to the weight of the projectile and inversely proportional to the acceleration due to gravity. This test is carried out at 23° C. and 50% relative humidity, and the test samples are conditioned for 24 hours at 23° C. and 50% relative humidity.

*Tensile strength, elongation and initial tensile modulus*

These measurements are made at 23° C. and 50% relative humidity. They are determined by elongating the film sample (samples are cut with a Thwing-Albert cutter which cuts samples ¼" wide) in an Instron tensile tester at a rate of 100%/minute until the sample breaks. The force applied at the break in lbs./sq. in. (p.s.i.) is the tensile strength. The elongation is the percent increase in the length of the sample at breakage. Initial tensile modulus in p.s.i. is directly related to film stiffness. It is obtained from the slope of the stress/strain curve at an elongation of 1%; both tensile strength and initial tensile modulus are based upon the initial cross-sectional area of the sample.

EXAMPLE 4

To 1.0 liter of stirred chlorobenzene and 35 ml. of dry chloroprene there was added 0.4 ml. (4 mmols) of vanadyl chloride ($VOCl_3$) and 12 ml. (12 mmols) of aluminum triisobutyl. Ten minutes after this addition was completed, the reaction mixture was cooled to $-10°$ C. and a flow of ethylene (175 ml./min.) was started while the temperature was kept below 10° C. At the end of 2¾ hours the reaction was terminated by the addition of 3% concentrated hydrochloric acid in methanol. The polymer was collected by filtration and washed successively in a Waring blender with 3% concentrated hydrochloric acid in methanol, 20% water in ethanol and with ethanol. The purified polymer, a fine powder, was dried in a vacuum oven at 50° C. to give 13 grams of a white powder. A film pressed from the white powder at 175° C. showed the presence of vinyl groups by the infrared absorption at 993 cm.$^{-1}$ and 910 cm.$^{-1}$. Chlorine analysis showed the polymer to contain approximately 2.5% by weight of chloroprene.

EXAMPLE 5

The procedure of Example 1 was repeated with the exception that n-hexane was employed as the solvent in place of chlorobenzene. The product showed only a very low isoprene content.

EXAMPLE 6

Example 1 was repeated with the exception that the reaction was carried out at 30° C. A product was obtained which on infrared analysis showed the presence of unsaturated groupings, predominantly in-chain unsaturation, as indicated by a strong absorption band at 840 cm.$^{-1}$.

The copolymers of this invention readily undergo reaction with mild oxidizing agents such as peracetic acid, nitrous acid and atmospheric oxygen and with active hydrogen-containing agents such as propanethiol-1, thiosalicyclic acid and concentrated sulfuric acid to yield products with desirable modifications in properties. In film form these copolymers are readily amenable to treatments employed to enhance adhesion of printing inks, coatings and the like.

A further characteristic of the ethylene/isoprene copolymers made in accordance with this invention is their ready tendency to cyclize under the influence of cationic or peroxidic type agents to yield completely saturated structures with an even more attractive combination of properties, as is more fully described and claimed in copending application Serial No. 789,274, now U.S.P. 3,168,501. If desired, the cyclization can be carried partly to completion, leaving residual appended unsaturated groups, which can be further modified as described in the preceding paragraph.

The main advantage of the products of this invention lies in the versatility afforded to the modification of polymer properties. When ethylene is copolymerized with isoprene, for example, as prescribed in this invention, a highly unsaturated product results, but the unsaturation resides in appended side chains and not in the main polymer chain. Thus, the desirable strength characteristics of the polyolefin can be retained while at the same time the copolymer has reactive side chain groups readily amenable to modifying reactions for such purposes as improved adhesion of coatings, increased printability, improved surface properties, improved weatherability and the like. By this invention, degrading of the basic polymer chain with the accompanying adverse effect on strength characteristics of the polymeric structure is avoided. The preferred copolymers in film form possess definitely better tenacity and impact strength than films from parent linear polyethylene. In addition, these products can be readily cyclized to give a polymer which shows essentially no residual unsaturation and which in film form shows evidence of even greater stiffness, better impact strength and tenacity while retaining the elongation and tear strength characteristics representative of a polymer such as polyethylene. Further, these copolymers possess a high degree of crystallinity in contrast to somewhat similar copolymers described in the art which are amorphous or of low degree of crystallinity, and they are thus amenable to various tensilizing treatments in film form to further enhance desirable film properties.

I claim:

1. A process which comprises copolymerizing from 99% to 75% by weight of at least one straight chain alpha olefin having 2 to 10 carbon atoms with at least one conjugated diene of the formula $$CH_2=CH-CR'=CH_2$$

wherein R' is a radical selected from the group consisting of methyl, ethyl, propyl, chlorine, fluorine, acetoxy, chloroacetoxy, butyroxy and cyano radicals in a liquid halogenated hydrocarbon solvent and at a temperature within the range of from $-30°$ C. to 10° C., in the presence of a catalytic amount of a catalyst formed from the reaction of vanadyl chloride with not more than threefold molar amount of aluminum triisobutyl, whereby to produce a highly crystalline, substantially linear copolymer wherein residual carbon-to-carbon unsaturation is located predominantly on pendant ethylene groups attached to the main polymer chain with no more than one mol percent of residual unsaturation located in the main polymer chain.

2. The process of claim 1 wherein the alpha olefin is ethylene.

3. The process of claim 1 wherein the conjugated diene is isoprene.

4. The process of claim 1 wherein the temperature is within the range of from $-10°$ C. to 10° C.

5. The process of claim 1 wherein the solvent is chlorobenzene.

References Cited by the Examiner

UNITED STATES PATENTS

| | | | |
|---|---|---|---|
| 2,898,329 | 8/1959 | Kittleson | 260—94.9 |
| 2,962,451 | 11/1960 | Schteyer | 260—94.9 |
| 3,112,301 | 11/1963 | Natta et al. | 260—85.3 |

FOREIGN PATENTS

| | | |
|---|---|---|
| 549,638 | 1/1957 | Belgium. |
| 552,719 | 12/1956 | Belgium. |
| 776,326 | 6/1957 | Great Britain. |
| 804,079 | 11/1958 | Great Britain. |
| 920,244 | 3/1963 | Great Britain. |

JOSEPH L. SCHOFER, *Primary Examiner.*